United States Patent [19]

Lauder

[11] Patent Number: 5,095,730
[45] Date of Patent: Mar. 17, 1992

[54] WHISKER REINFORCED CERAMIC MATERIAL WORKING TOOLS

[75] Inventor: Edward A. Lauder, Greer, S.C.

[73] Assignee: Advanced Composite Materials Corporation, Greer, S.C.

[21] Appl. No.: 719,059

[22] Filed: Jun. 18, 1991

Related U.S. Application Data

[63] Continuation of Ser. No. 430,959, Nov. 1, 1989, abandoned, which is a continuation of Ser. No. 175,394, Mar. 30, 1988, abandoned.

[51] Int. Cl.$^5$ ...................... B21D 22/28; B21D 37/01
[52] U.S. Cl. ........................................ 72/347; 72/462; 72/467
[58] Field of Search ................. 72/347, 462, 467, 348, 72/349; 501/89

[56] References Cited

U.S. PATENT DOCUMENTS

| | | |
|---|---|---|
| 2,329,173 | 9/1943 | Fife . |
| 2,878,561 | 3/1959 | Wheeler et al. . |
| 3,125,974 | 3/1964 | Toulmin, Jr. . |
| 3,145,586 | 8/1964 | Brearley et al. . |
| 3,459,842 | 8/1969 | Wakefield et al. . |
| 3,807,212 | 4/1974 | Lawson . |
| 3,833,389 | 9/1974 | Komeya et al. . |
| 3,893,326 | 7/1975 | Oberlander et al. ................ 72/467 |
| 3,930,396 | 1/1976 | Martinez . |
| 3,998,174 | 12/1976 | Saunders ............................. 72/349 |
| 4,105,443 | 8/1978 | Dearnaley et al. . |
| 4,146,080 | 3/1979 | Baum . |
| 4,158,687 | 6/1979 | Yajima et al. . |
| 4,228,673 | 10/1980 | Scheel ................................. 72/467 |
| 4,270,380 | 6/1981 | Gulati et al. ....................... 72/467 |
| 4,464,192 | 8/1984 | Layden et al. . |
| 4,507,224 | 3/1985 | Toibana et al. . |
| 4,522,049 | 6/1985 | Clowes ................................ 72/349 |
| 4,543,345 | 9/1985 | Wei . |
| 4,746,635 | 5/1988 | Inoue . |
| 4,769,346 | 9/1988 | Gadkaree et al. . |

FOREIGN PATENT DOCUMENTS

| | | | |
|---|---|---|---|
| 118201 | 9/1984 | European Pat. Off. ............. | 72/462 |
| 208910 | 6/1986 | European Pat. Off. . | |
| 194811 | 9/1986 | European Pat. Off. . | |
| 112135 | 8/1980 | Japan ................................... | 72/467 |
| 59-54680 | 4/1984 | Japan . | |
| 59-102681 | 6/1984 | Japan . | |
| 130426 | 7/1985 | Japan ................................... | 72/462 |
| 343002 | 2/1931 | United Kingdom ................. | 72/462 |
| 954285 | 4/1964 | United Kingdom . | |

OTHER PUBLICATIONS

Wei and Becker, "Development of SiC Whisker-Reinforced Ceramics", Am. Cer. Soc. Bulletin, 64 (2), 298-304, 1985.

"The Application of WG-300 'Whisker' Reinforced Ceramic/Ceramic Composites", Greenleaf Corporation, (undated).

*The Canmaker*, vol. 4: Jun. 1991 (ISSN 0953-8690) pp. 14-15.

*Primary Examiner*—Lowell A. Larson
*Attorney, Agent, or Firm*—Banner, Birch, McKie & Beckett

[57] ABSTRACT

A method of making whisker reinforced ceramic tools and components for shaping or otherwise working materials. The invention has particular application in making metal working tools, and specifically tools used in the manufacture of two-piece aluminum beverage cans. Methods for shaping material, particularly methods for making tubular casings and two-piece cans are also disclosed.

17 Claims, 4 Drawing Sheets

WHISKER REINFORCED CERAMIC MATERIAL WORKING TOOLS

This application is a continuation of application Ser. No. 07/430,959, filed Nov. 1, 1989, which is a continuation of application Ser. No. 07/175,394, filed Mar. 30, 1988, now abandoned.

BACKGROUND OF THE INVENTION

The invention relates to a method of making whisker reinforced ceramic tools for shaping or otherwise working materials. The invention has particular application in making metal working tools, and specifically tools used in the manufacture of tubular casings and similar articles, such as two-piece beverage cans.

Tools for imparting a desired shape, form, or finish to a material, such as dies, punches, and the like, must be characterized by extreme hardness, compressive strength and rigidity. This is particularly necessary when shaping metals or similar materials. Commercial material working tools for assembly line mass production must also be resistant to wear, erosion and chipping from repeated and continuous stress, and abrasion. These tools must also be made from materials which can be designed and machined to close tolerances and maintain dimensional stability over a wide range of operating conditions.

It is known to make punches, dies, deep draw tooling and similar material working tools from a variety of materials, including metals, tungsten carbide, and conventional ceramics. These known materials all have certain undesirable limitations. When making tools for shaping metal articles, particularly tubular casings such as two-piece beverage cans, the problems of prior known materials becomes particularly significant.

Beverage cans are generally made either as a three-piece can or a two-piece can. In a conventional three-piece beverage can, an appropriately sized body blank is cut from a large metal plate and bent into a cylindrical tube having a soldered side seam. The ends of the tube are flanged. An end closure member, or lid, is attached to one end of the body. A second end closure member is applied after filling the can. The body and two end closures constitute the three-piece can. For printed cans the metal plate is printed prior to cutting the plate into individually sized body blanks.

A two-piece beverage can has a body having an integrally formed closed end and a single end closure member. A two-piece beverage can is manufactured by a process fundamentally different than that for making a three-piece can. Two-piece cans have been available only since the early 1970s. The present invention provides significant advantages particularly in the manufacture of two-piece beverage cans. However, as will be readily understood from the following description of the invention, the invention has broad applicability for use in manufacturing a variety of shaped articles, particularly tubular casings, such as fountain pens and dry cell battery casings.

A two-piece can is made by a drawing and wall ironing process that results in only two-pieces, a combined body and base and an end closure. In general, a two-piece can is made by stamping out metal discs from a metal plate. A metal "cup" is formed from the disk by holding the disk in a cup-forming die and moving a cup-forming punch through the cup-forming die. The formed cups are then transferred to a body making machine where they are pushed through a body-forming die comprising a plurality of annular rings, generally known as draw, redraw, and ironing rings, by a body-forming punch. The clearances between the body-forming punch and the plurality of rings become progressively smaller, so that the cup walls are ironed out into a thin section. A domer punch will then press the bottom of the can body into a concave configuration for added strength.

After the body is formed, the open end of the can is trimmed to the exact desired length. The can is then washed, dried, and prepared for necking, i.e., the process of forming a neck on the open end. However, before necking, for cans that are to be printed with a label, the can may be transferred to a multi-station printer. The can is placed onto a printer mandrel which brings the can into engagement with a paint roller. After printing the can is moved to a drying oven.

The final step in forming a two-piece can is necking and flanging. These operations prepare the top of the can so that it is ready to receive a lid after being filled. Generally, this is done in a multistage die-necking machine which includes a necker die, for necking-in the open end of the can, and a disc for forming a flange on the necked-in, open end of the can. This disc is generally referred to as a "spinnecker" disc.

Throughout the process of making a two-piece beverage can, various special tooling is required. This tooling must be sufficiently strong, abrasion resistant and inert to produce an acceptable can. In 1986, over 70 billion metal beverage cans were manufactured in the United States. These cans were made on production lines which produce cans at a rate of 1200 to 2000 cans per minute. Ninety-five (95%) percent of those cans were made of aluminum, with the remainder being made of steel. The present invention may be used in the manufacture of both aluminum and steel cans, as well as other metal and nonmetal products.

Because of the tremendous volume of beverage cans manufactured each year, each slight improvement in the manufacturing process can result in tremendous savings. Over the years, for instance, the industry has made every possible effort to reduce the weight of the cans so as to reduce material costs. In 1965, one thousand aluminum beverage cans weighed 51.6 pounds, whereas in 1986 one thousand aluminum beverage cans weighed 27.5 pounds. As technology has advanced, there have also been marked improvements in strength, dimensional consistency, and quality of finish. However, further improvements are still sought.

The most common material for the various tools used in the process of making a two-piece beverage can, including the cup-forming die and cup-forming punch, the body-forming die and body-forming punch, the necker die and the spinnecker disc, is tungsten carbide, usually held in a hardened tool steel body. However, tungsten carbide can-making tools wear considerably and must be replaced or refinished often. Additionally, when making aluminum cans, tungsten carbide tools contribute to the formation of aluminum oxide on the surface of the aluminum cans, which must be removed prior to filling the can with a beverage. Also, particularly in aluminum cans, the commonly used tungsten carbide can-making tools leave scratch marks on the surface of the can body. These scratches create points of stress concentration and significantly reduce the strength of the can sidewall, which generally is only 0.004 inches thick. A more uniform wall thickness results in a greater stacking strength, less collapsing, and less leakage from cans. The scratches also make finishing the inside and outside surfaces of the can more difficult. Because of the lack of a smooth, finished surface significantly more epoxy resin coating must be used to coat the inside of the can. Printing on the outside of the can is also adversely affected.

Tungsten carbide components also generate considerably more heat through friction during the can-making process. The heat resulting from the friction causes a significant variance in the dimensions of the can, including wall thicknesses. To reduce the friction, it is common to use synthetic lubricants. These lubricants, however, require intensive washing of the can to remove the lubricant. This is a difficult, costly and time-consuming step.

The present invention is specifically intended to overcome the deficiencies of tungsten carbide components used in the manufacture of two-piece cans. However, as will be readily understood from the following description, the invention has broad applicability to the manufacture of other articles.

SUMMARY OF THE INVENTION

The present invention relates to a method of making whisker reinforced ceramic tools used to shape materials. Preferably, the method comprises using a ceramic matrix selected from the group consisting of alumina, silicon nitride, silicon carbide, zirconia, boron carbide, or titanium diboride. The matrix is preferably reinforced with single crystal "whiskers" selected from the group consisting of silicon carbide, silicon nitride, titanium nitride, titanium carbide, aluminum nitride or alumina. The invention uses single crystal whiskers, which are to be distinguished from polycrystalline short fibers of filaments. Whiskers have been defined as a generic class of single crystal materials having mechanical strengths equivalent to the binding forces of adjacent atoms. Whiskers derive their exceptional strength from the fact that they are essentially perfect crystals. Their extremely small diameters allow little room for defects which weaken larger crystals.

In a preferred embodiment of the invention, the invention relates to a method of making tools, or components, used in manufacturing a tubular casing, particularly a two-piece can. The invention also relates to the method of making the tubular casing or can itself.

The preferred form of the invention comprises tools made from a composite ceramic matrix having distributed therethrough 2–40 volume percent silicon carbon whiskers. The can-making components or tools made from this material to be used in the method of the preferred embodiment of the invention would include the cup-forming die, the cup-forming punch, the body-forming die, the body-forming punch, the domer element, the printing mandrel, the necker dies, and the spinnecker disc. Preferably, the matrix material comprises alumina or silicon nitride. The matrix may, however, contain less than 30 volume percent of zirconia, yttria, hafnia, magnesia, lanthana or other rare earth oxides, silicon nitride, titanium carbide, titanium nitride or mixtures thereof.

The whisker reinforced ceramic composite components used in the method of the present invention generate less friction and thus less heat than comparable tungsten carbide components. Because little heat is generated, variance in the dimensions of the can, including roundness and wall thickness, is minimized. Consistency in wall thicknesses contributes to the load strength of the cans, whereas roundness also facilitates effective assembly of the end closure to the can. Since there is less friction, the need to use expensive lubrication is minimized and, in some instances, may be completely eliminated. This also simplifies the machinery for making cans since no lubricant reservoir and applicator is required. Also, the need for intensive washing of the can to remove the lubricant is eliminated.

Unlike tungsten carbide, the whisker reinforced ceramic composite will not contribute to the formation of aluminum oxide on the surface of aluminum cans, even when using an alumina matrix as in the preferred form of the invention. This is a significant benefit in can making, since the aluminum oxide must be washed from the cans, and also builds up on components, adversely affecting their performance. It was originally believed that an alumina matrix would not be acceptable for making aluminum products since it was thought that the alumina would interact with the aluminum. It has been found, however, that the silicon carbide whisker reinforced alumina matrix in the preferred form of the present invention does not interact with the aluminum and, in fact, results in less aluminum oxide formed on the surface of the cans and the components or tools than with tungsten carbide components.

Because of the decreased wear rate and the smoothness of the whisker reinforced ceramic composite material used in the present invention, the amount of scoring on the insides and outsides of cans is drastically reduced over that which occurs with the use of traditional materials. The improvement in surface finish increases the strength of the cans. Also, the surfaces of the cans obtain a much smoother and more "polished" appearance which is much easier and less costly to finish, either by the application of a resin on vinyl coating on the interior or surface decoration on the exterior surface. Additionally, the whisker reinforced ceramic composite components used in the present invention have useful service lives generally two to three times longer than those of comparable tungsten carbide components.

Another significant improvement of the whisker reinforced ceramic composite components used in the present invention in comparison to conventional components is the light weight of the components themselves. The lighter weight is particularly important for tools such as the body-forming punch used in making a two-piece can. The body-forming punch, which operates at high speed with frequent direction changes, causes great stress to the supporting machine structure. A lighter weight punch significantly reduces the stress on the supporting machine structure. Additionally, a lighter weight punch reduces the amount of cantilever deflection as the punch moves through its cycle. This deflection may cause damage to the tooling on the return stroke resulting in uneven wear and nonuniform wall thickness.

The whisker reinforced ceramic tools or components of the present invention are also significantly easier to grind or finish into a final desired shape than the traditional tungsten carbide counterpart. This is particularly important when making precision machine tools.

It also has been found that trimming a can with a whisker reinforced ceramic component results in a cleaner, sharper, or straighter edge than with a tungsten carbide component, which leaves a feathered edge.

DETAILED DESCRIPTION OF A PREFERRED EMBODIMENT

The present invention will be described in the context of its preferred embodiments of making tools, such as dies, punches, and other components, for manufacturing a can. Although the invention is described in the context of particular tools or components for making two-piece beverage cans, the invention has general utility in making other tools or components for shaping articles. The invention has particular utility in making tubular articles, such as pen casings, battery casings, and the like. It will be readily apparent also that the present invention may be used for shaping or otherwise working both metal, nonmetal, and composite objects.

Figure 1:
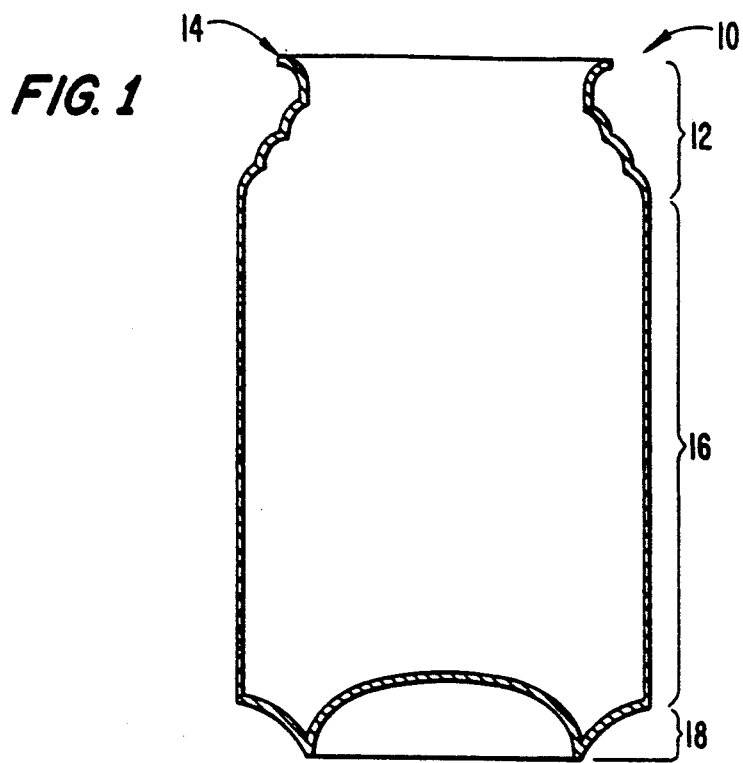
FIG. 1 is a cross-section of a typical beverage can.
Figure 2:
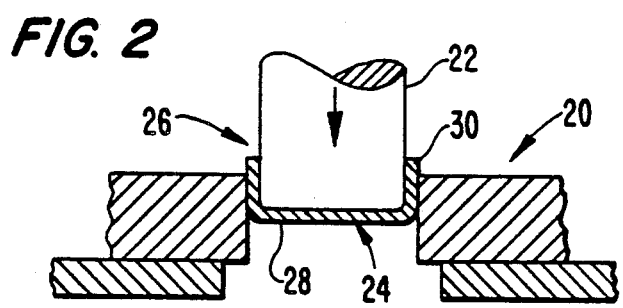
FIG. 2 is a representation of a cupping operation in the draw and ironing process of making a can.

A cross-section of the integral body of a typical two-piece can 10 manufactured according to the method of the present invention is shown in FIG. 1. Can 10 includes a neck 12, having an outwardly turned flange 14. An end closure (not shown) will be fitted to flange 14 after the can is filled with a beverage or other desired filling. Typically, the wall thickness of neck 12 is 0.007 inches.

Can 10 includes a can body sidewall 16. The thickness of can body sidewall 16 generally is 0.004 inches. It is important to the strength of the can that this thickness remain constant. As explained in detail below, typically can body 16 is formed by extending a body-forming punch through a body-forming die having a plurality of rings for ironing the sidewall. A conventional punch made from tungsten carbide weighs approximately twelve pounds. Because of the instability of moving this much weight with precision, the punch may move slightly from its desired course on the return stroke. This deflection may cause slight damage or chipping of the punch, resulting in uneven wear, which in turn causes an uneven wall thickness. Conversely, a body-forming punch made according to the method of the present invention using a composite material comprising an alumina ceramic matrix having distributed therethrough silicon carbide whiskers weighs only approximately three pounds and thus is subject too less sag or variation in position in the course of its travel, which results in less wear. The sidewall thus produced has a more constant thickness and is stronger.

The bottom 18 of can 10 typically has a wall thickness of approximately 0.012 inches and has a concave configuration for added strength.

Can 10 is made by a process known as a draw and wall ironing process, generally shown in FIGS. 2-5. The process usually begins with individual discs which are stamped from a large coil of sheet metal as it is fed into a cupping press. Most two-piece cans are made from aluminum, although the method of the present invention may be used with other metals and nonmetal materials as well. Generally, the metal stock has a thickness of approximately 0.012 inches. The metal disc is mounted in a cup-forming die 20, shown generally in FIG. 2. A cup-forming punch 22 moves through the cup-forming die to shape the disc into a "cup" 24 having an open end 26, a closed bottom end 28, and integral sidewalls 30 extending substantially perpendicular to the closed bottom end. The cup thus formed generally has a diameter of approximately 3.5 inches and a depth of approximately 1.3 inches, with a wall thickness of approximately 0.012 inches. Both cup-forming die 20 and cup-forming punch 22 may be formed from a whisker reinforced composite ceramic matrix, as described in detail below.

Figure 3:
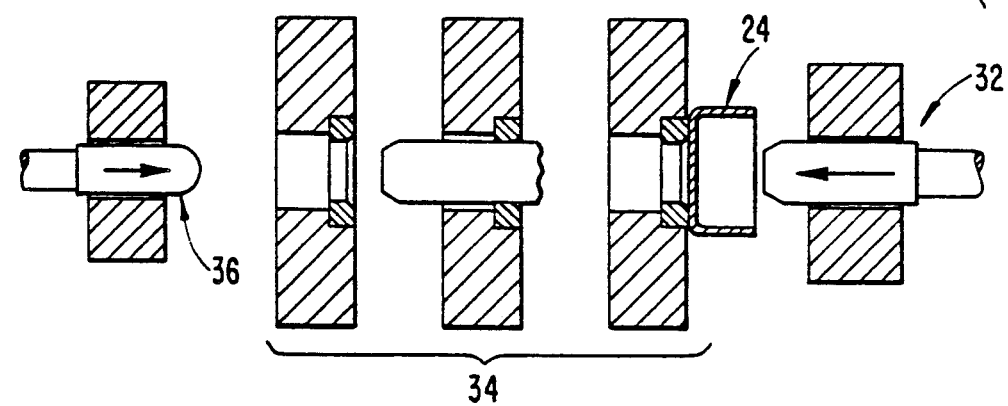
FIG. 3 is a representation of a body maker for a can, including a body-forming die having draw, redraw, and ironing rings, and a domer element.

The formed cups 24 are then transferred to a body maker, as shown generally in FIG. 3. The body maker generally comprises a body-forming punch 32, a body-forming die 34, and a domer element 36. Body-forming 34 die generally comprises a plurality of rings usually referred to as draw, redraw, and ironing rings. These rings are supported in a conventional die support as is well-known. Body-forming punch 32 moves through the draw, redraw, and ironing rings to thin and lengthen the sidewalls 30 of cup 24. This is generally referred to as "ironing" the sidewalls. The draw, redraw, and ironing rings provide a progressively decreasing clearance with the body-forming punch 32 so that cup 24 is ironed into its desired shape. The draw, redraw, and ironing rings must be shaped and sized precisely to provide the requisite shape and varying thicknesses for the neck, sidewall, and base of the can. When formed in the body maker, the cup 24 has been shaped into a can approximately 2.5 inches in diameter and 5.0 inches deep.

The body maker also includes domer element 36 which provides a concave configuration to the can bottom.

Body-forming punch 32, body-forming die 34, including the draw, redraw, and/or ironing rings which may comprise die 34, and domer element 36 may each be formed from a whisker reinforced ceramic matrix.

After ironing the sidewall and doming the bottom, the open end of the can is trimmed to the exact desired length. The can is then washed and dried.

Figure 4:
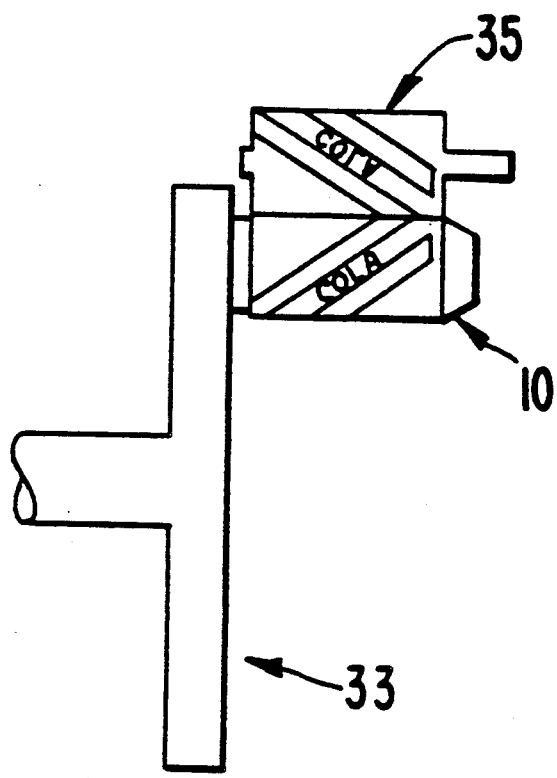
FIG. 4 is a representation of a printer mandrel of a multistation printer for printing on the outside surface of a can.
Figure 5A:
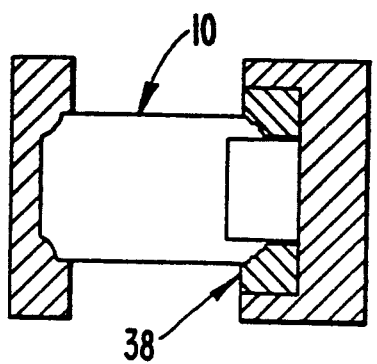
FIGS. 5a and 5b are representations of a multi-stage die necking station, including a necking-in station having a necker die assembly and a flanging station having a spinnecker disc.
Figure 5B:
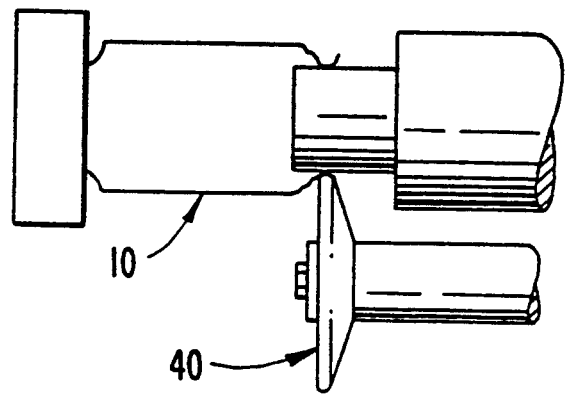

The can may be transferred to a multi-station printer, if an exterior label is to be printed on the can, as shown generally in FIG. 4. The can is placed onto a printer mandrel 33 which moves the can body into printing engagement with a print roller 35. Printer mandrel 33 may be formed from a whisker reinforced ceramic matrix.

After the printing is applied, the can is transferred to a multistage die necking station. Generally, this station performs two functions. It forms a neck on the open end of the can and also forms a flange on the open end of the can. The neck is formed by pressing the can body sidewall adjacent the open end of the can body against a necker die 38 to thereby form a neck of reduced diameter, as shown generally in FIG. 5A. The multistage die necking station also forms a flange on the open end of the necked-in can body by pressing the can body sidewall adjacent the open end of the can body against a spinnecker disc 40. A spinnecker disc is a can tool element which forms an outwardly flared flange on the can. The necker die and spinnecker disc may be made according to the method of the present invention using a whisker reinforced composite ceramic matrix.

After flanging, the can interior is sprayed with an appropriate coating. The can, with an enclosure element for the open end, then is sent for filling and sealing.

Because whisker reinforced ceramic body-forming dies, including the draw, redraw, and ironing rings provide much less friction than the prior art tungsten carbide counterparts, the manufactured cans are significantly cooler in temperature, resulting in less sidewall deformation. As a result, the cans maintain their shape, i.e., roundness, much better. Additionally, the need to use a lubricant on the cans during the manufacturing process is minimized or eliminated.

Figure 6A:
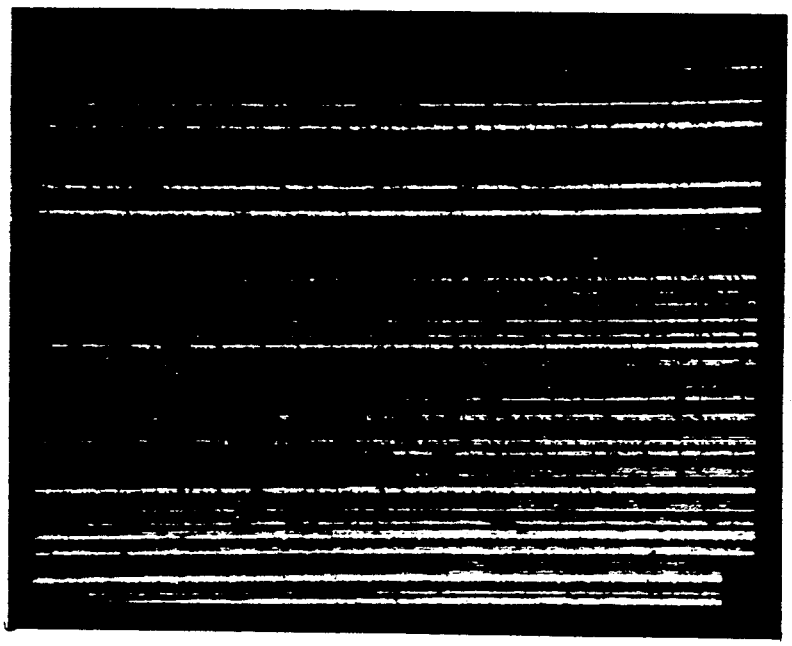
FIG. 6a is a 100× magnified photo of an aluminum can manufactured with tungsten carbide ironing rings.
Figure 6B:
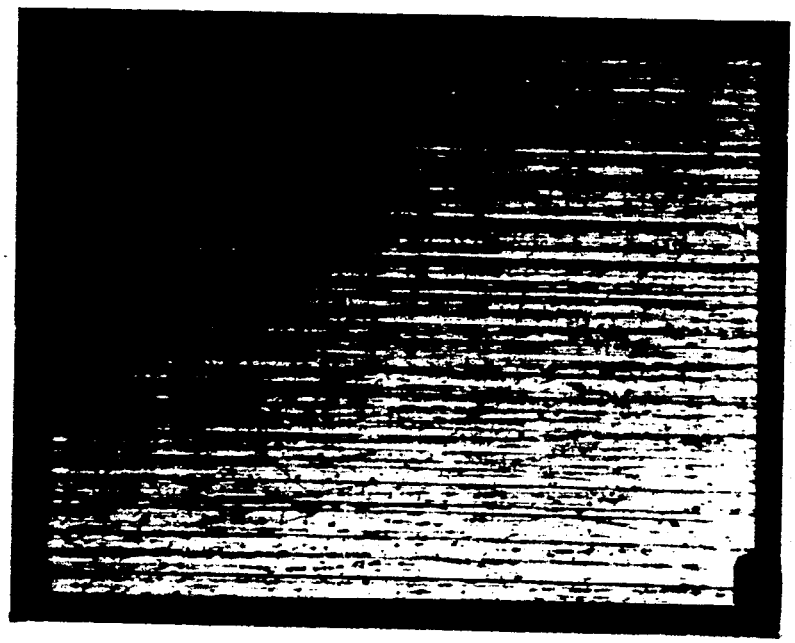
FIG. 6b is a 100× magnified photo of an aluminum can manufactured with whisker reinforced ceramic ironing rings according to the present invention.

The whisker reinforced ceramic also gives a superior finish and smoothness to the can. These smooth surfaces provide significant advantages in finishing both the inside and outside of the can. FIG. 6A illustrates a 100× magnification of an aluminum can sidewall manufactured with standard tungsten carbide ironing rings. As is evident, there are significant scratch marks which both weaken the sidewall and make it difficult to apply a smooth uniform coating. FIG. 6B illustrates a 100× magnification of an aluminum can sidewall manufactured with silicon carbide whisker reinforced alumina ironing rings according to the present invention. The smoother surface provides significantly increased strength and facilitates the application of printing to the outside or coating to the inside of the can. The smoother sidewalls are also easier to wash, since there are no crevices in which material may be trapped.

The whisker reinforced ceramic composite materials used in making the various components involved in manufacturing a can according to the present invention are made from a whisker reinforced ceramic matrix. This ceramic composite material is characterized by extreme hardness, compressive strength and rigidity, combined with greatly improved toughness. It has been found that the material provides resistance to wear and erosion from abrasion and has the ability to withstand thermal or chemical degradation. The material is nearly inert.

The ceramic matrix may be selected from the group consisting of alumina, silicon nitride, silicon carbide, zirconia, boron carbide or titanium diboride. The ceramic matrix may be used either alone (i.e., containing no other materials except recognized impurities) or it may be combined with minor amounts (i.e., less than about 30%) of toughening components or sintering aids such as zirconia, yttria, hafnia, magnesia, lanthana or other rare earth oxides, silicon nitride, titanium carbide, titanium nitride or mixtures thereof. In the most preferred form of the invention an alumina matrix is used. A silicon nitride matrix is also preferred. Since one of the problems in the production of aluminum cans is the formation of aluminum oxide, it was thought that an alumina matrix ceramic could not be used for the production of aluminum cans since it was believed that the alumina matrix would have an affinity for the aluminum in the cans and would increase rather than eliminate the presence of aluminum oxide. In practice, this is not the case.

The reinforcing whiskers may be selected from the group comprising silicon carbide, silicon nitride, aluminum nitride, titanium nitride, titanium carbide or alumina. The whiskers used in the invention have a single crystal structure. In the preferred form of the invention silicon carbide whiskers are used. Such whiskers are produced from rice hulls and typically have diameters in range of 0.35 um to 0.65 um and aspect rations on the order of 15–150. Strengths are typically on the order of 1 million psi (70,000 kg/cm$^2$) and tensile moduli on the order of 60–100 million psi (4–7 million kg/cm$^2$). The silicon carbide whiskers are thermally stable to at least 3200 F. (1760 C.).

The single crystal whiskers used in this invention are to be distinguished from short fiber materials of the polycrystalline type. The polycrystalline filaments or chopped fibers are much larger in diameter e.g., 10 microns or larger. Additionally, in contrast to the single crystal whiskers used in the method of the present invention, polycrystalline fibers suffer considerable degradation due to grain growth at temperatures above about 1250 C., which severly limits their use in high temperature fabrication processes such as hot processing for producing ceramic composites of nearly theoretical density. As disclosed in detail below, the present invention encompasses a method for making components using hot processing techniques. Also, these polycrystalline fibers provided insufficient resistance to cracking of the ceramic composite since the fibers extending across the crack line or fracture plane possess insufficient tensile strength to inhibit crack growth through the composite, especially after the composite has been fabricated by being exposed to elevated pressures and temperatures in hot pressing. Thus, there is recognized a clear distinction between single crystal "whiskers" and polycrystalline fibers.

The whiskers used in the present invention must be bound in the matrix in a manner so as to produce reinforcement of the matrix. Bonding is satisfactory and good reinforcement is obtained when the whisker content is in the range of from about 2–40% volume percent of the whisker/matrix composite. This is course results in the percentage of matrix material being 60–98%. It has been generally found that above about 40% whisker content the addition of whiskers becomes detrimental to the toughness of the composite ceramic material. It is believed that this may be due either to the whisker content becoming sufficiently large that zones of whisker concentration themselves have a limited toughness or that the ceramic matrix develops points at which the matrix cohesiveness is reduced. Below about 2% there is insufficient whisker content to provide adequate reinforcement.

The dies, punches, and other tools or component parts made according to the method of the present invention are formed by first blending the proper proportions of the ceramic matrix in powdered form with the whiskers. A wide variety of systems are known for mixing of particulate solids. The blending must be such that the whiskers are thoroughly dispersed throughout the particulate ceramic matrix material, but not be so severe that the whiskers are significantly degraded. A presently preferred method is described in U.S. Pat. No. 4,463,0358. The preferred material and ranges of whisker content will depend on the particular component part to be made and its end use. The process by which the component will be made, either cold pressing or hot pressing will, in turn, depend on the percentage of whisker content and the desired strength and fracture toughness.

Figure 7:
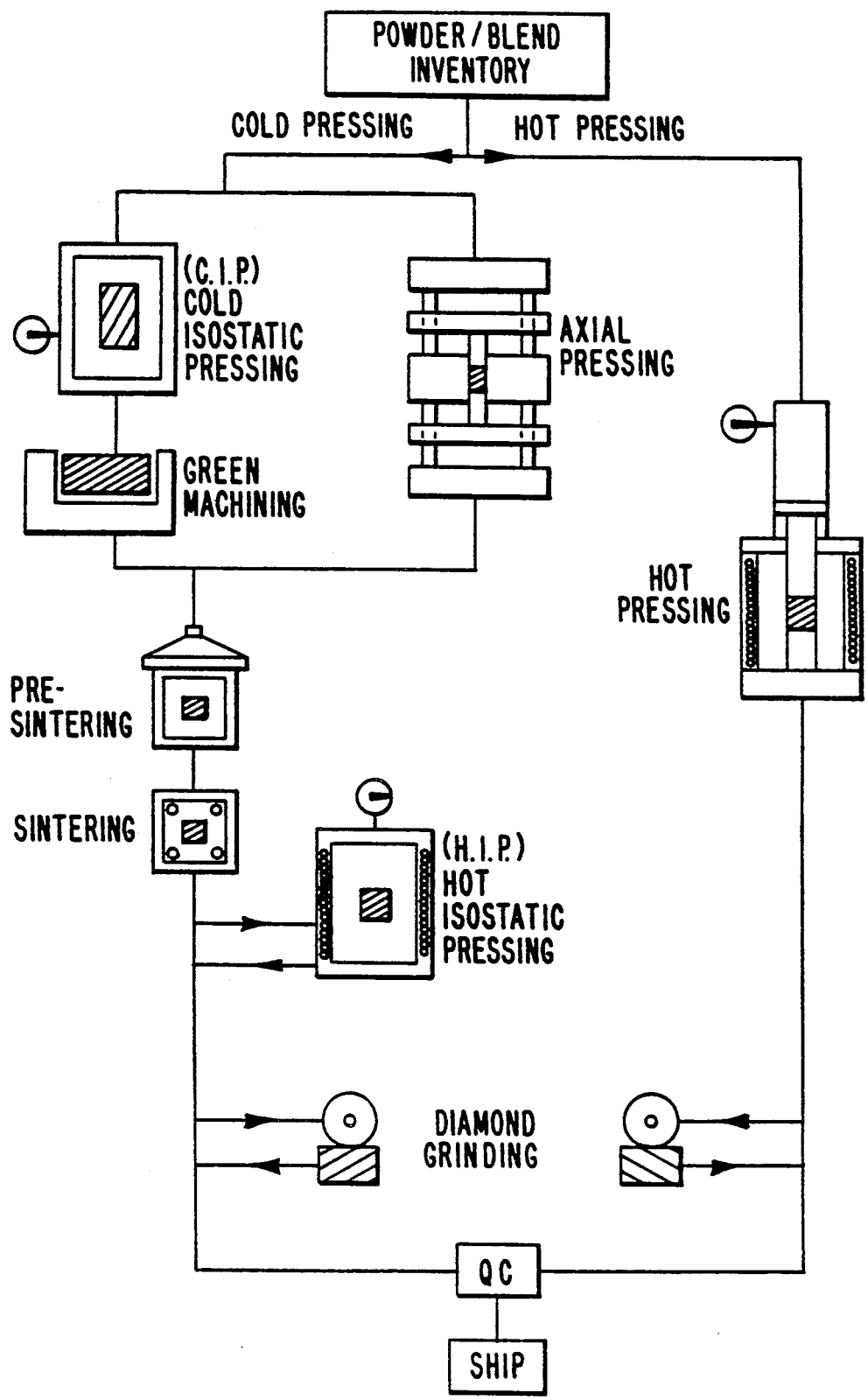
FIG. 7 is a schematic illustration of the method of making whisker reinforced ceramic components according to the present invention.

The particular method to be used in making the components according to the present invention depends primarily on the percentage of whisker content and the desired strength and fracture toughness. For a whisker content of between two and twelve volume percent, cold pressing, including pressureless sintering techniques, may be used. With respect to making tools for manufacturing a two-piece beverage can, cold pressing techniques, including pressureless sintering, are appropriate for making the can body punch, the domer element, the die necker, the spinnecker and the printer mandrel, all of which preferably use a whisker content of approximately 8.7 volume percent. Using the cold pressing technique, including pressureless sintering, as shown in FIG. 7, the appropriate blend of whisker reinforced ceramic is formed into its desired shape using cold isostatic pressing or axial pressing. The cold pressed material is then sintered. The sintered cold pressed material may then be subject to a hot isostatic pressing process. The component may then be ground into its final desired shape. The cold pressed material may be formed in one of several different ways. It may be cold isostatically pressed and formed under a pressure of 10–20,000 psi at ambinent temperature. Alternatively, the component may be dry pressed by mechanically pressing the component into shape at 10–25,000 psi. The component also may be extruded or injected molded. Following one of these four processes of cold pressing, the component is sintered at 1500°–1700° C. without pressure for 12–48 hours.

A hot pressing technique is generally appropriate for components using between 12–40 volume percent whisker content. With respect to components used in manufacturing a two-piece can, the hot pressing process is appropriate for making the cup-forming punch and cup-forming die and the body-forming die including the draw, redraw and ironing rings, which preferably have a whisker content of approximately 29 volume percent.

In both the cold pressing and hot pressing processes, the formed component is ground to final shape.

It will be evident that there are a wide variety of embodiments of the present invention which are not specifically described above but which are clearly within the scope of the present invention. The above description is therefore intended to be exemplary only and the scope of the invention is to be limited only by the appended claims.

I claim:

1. A method of making an aluminum tubular casing by cold drawing comprising the steps of:
    retaining an aluminum workpiece in a shape-forming die; and moving a shape-forming punch through said shape-forming die;
    wherein at least one of said shape-forming die and said shape-forming punch comprises a composite ceramic matrix comprising alumina having distributed therethrough 2–40 volume percent monocrystalline silicon carbide whiskers, wherein said composite does not contribute to the buildup of aluminum oxide on the surface of said die or said punch.

2. A method as recited in claim 1 wherein said composite comprises 60–87 volume percent matrix and 13–40 volume percent whiskers.

3. A method as recited in claim 1 wherein said composite comprises 88–98 volume percent matrix and 2–12 volume percent whiskers.

4. A method as recited in claim 1 wherein said matrix further contains a sintering aid.

5. A method of making a can be cold drawing comprising the steps of:
    forming a one-piece cup from an aluminum plate by mounting the plate in a cup-forming die and moving a cupforming punch through the cup-forming die, said formed cup having a closed bottom end, an open end, and integral sidewalls extending substantially perpendicular to the closed bottom end;
    forming a can body from said cup by mounting the cup in a body-forming die and moving a body-forming punch through the body-forming die thereby ironing the sidewalls of the cup;
    forming a domed bottom end on the can body by pressing a domer element against the closed bottom end of the can body;
    forming a neck on the open end of the can body by pressing the can body sidewall adjacent the open end of the can body against a necker die to thereby form a neck of reduced diameter; and
    forming a flange on the open end of the can body by pressing the can body sidewall adjacent the open end of the can body against a spinnecker disc;
    wherein at least one of the tools selected from the group consisting of said cup-forming die, said cup-forming punch, said body-forming die, said body-forming punch, said domer element, said necker die, and said spinnecker disc being made with a composite ceramic material including a matrix comprising alumina and having distributed therethrough 2–40 volume percent monocrystalline silicon carbide whiskers, wherein said composite does not contribute to the buildup of aluminum oxide on the surface of the tool.

6. A method as recited in claim 5 wherein said matrix comprises 60–87 volume percent alumina and 13–40 volume percent whiskers.

7. A method as recited in claim 5 wherein said matrix comprises 88–98 volume percent alumina and 2–12 volume percent whiskers.

8. A method as recited in claim 5 wherein said matrix further contains a sintering aid.

9. A method of making an aluminum tubular casing by cold drawing comprising the steps of:
    retaining an aluminum workpiece in a shape-forming die; and moving a shape-forming punch through said shape-forming die;
    wherein at least one of said shape-forming die and said shape-forming punch comprises a composite ceramic which comprising an alumina matrix having distributed therethrough 2–40 volume percent monocrystalline whiskers selected from the group consisting of silicon carbide, silicon nitride, titanium nitride, titanium carbide, aluminum nitride, and alumina; and
    wherein said composite does not contribute to the buildup of aluminum oxide on the surface of said die or said punch.

10. A method as recited in claim 9 wherein said composite comprises 60–87 volume percent matrix and 13–40 volume percent whiskers.

11. A method as recited in claim 9 wherein said composite comprises 88–98 volume percent matrix and 2–12 volume percent whiskers.

12. A method as recited in claim 9 wherein said matrix further contains a sintering aid.

13. A method of making a can by cold drawing comprising the steps of:
- forming a one-piece cup from an aluminum plate by mounting the plate in a cup-forming die and moving a cupforming punch through the cup-forming die, said formed cup having a closed bottom end, an open end, and integral sidewalls extending substantially perpendicular to the closed bottom end;
- forming a can body from said cup by mounting the cup in a body-forming die and moving a body-forming punch through the body-forming die thereby ironing the sidewalls of the cup;
- forming a domed bottom end on the can body by pressing a domer element against the closed bottom end of the can body;
- forming a neck on the open end of the can body by pressing the can body sidewall adjacent the open end of the can body against a necker die to thereby form a neck of reduced diameter; and
- forming a flange on the open end of the can body by pressing the can body sidewall adjacent the open end of the can body against a spinnecker disc;
- wherein at least one of the can tools selected from the group consisting of said cup-forming die, said cup-forming punch, said body-forming die, said body-forming punch, said domer element, said necker die, and said spinnecker disc is made with a composite ceramic matrix comprising alumina and having distributed therethrough 2–40 volume percent monocrystalline whiskers selected from the group consisting of silicon carbide, silicon nitride, titanium nitride, titanium carbide, aluminum nitride, and alumina; and
- wherein said composite does not contribute to the buildup of aluminum oxide on the surface of said die or said punch.

14. A method as recited in claim 13 wherein said composite comprises 60–87 volume percent matrix and 13–40 volume percent whiskers.

15. A method as recited in claim 13 wherein said composite comprises 88–98 volume percent matrix and 2–12 volume percent whiskers.

16. A method as recited in claim 13 wherein said matrix further contains a sintering aid.

17. A method of making an aluminum tubular casing by cold drawing comprising the steps of:
- retaining an aluminum workpiece in a shape-forming die; and moving a shape-forming punch through said shape-forming die;
- wherein at least one of said shape-forming die and said shape-forming punch comprises a composite ceramic which comprises a matrix consisting of alumina and a sintering aid and further comprising 2–40 volume percent monocrystalline silicon carbide whiskers distributed through said matrix.

* * * * *